Patented May 26, 1942

2,284,126

UNITED STATES PATENT OFFICE 2,284,126

BISMUTH SALTS OF OXY ACIDS

Herman A. Bruson, Germantown, Pa., assignor to The Resinous Products & Chemical Company, Philadelphia, Pa.

No Drawing. Application February 26, 1936, Serial No. 65,789

2 Claims. (Cl. 260—447)

This invention relates to the production of oil-soluble bismuth salts of ether acids and to their oil solutions that may be used therapeutically in the treatment of spirochetosis.

It has heretofore been known that bismuth compounds are toxic to spirochetes and similar micro-organisms and are effective agents for combating the diseases caused by these pathogens. The usual method of applying the bismuth compound is to colloidally disperse or, preferably, dissolve it in an animal or vegetable oil and to inject it intramuscularly into the arm or leg of the patient. The bismuth salts of various organic acids have been proposed for this purpose but they all have the disadvantage of either being insoluble in animal and vegetable oils or they are unstable and tend to decompose and form insoluble compounds while being dissolved or while in solution. Because of the instability of these compounds, the toxic strength of their oil solutions was never accurately known and regularity of action was practically incapable of attainment.

It is the object of this invention to remedy these defects by providing stable bismuth compounds that are soluble in vegetable and animal oil.

A further object of the invention is to provide stable vegetable and animal oil solutions of bismuth compounds.

Another object of the invention is to provide oil solutions of bismuth compounds of such a character that their toxic strength does not vary and which can be duplicated as desired.

A still further object of the invention is to provide oil solutions of bismuth compounds that may be used generally in combating micro-organisms.

These objects I have attained through my discovery that the bismuth salts of ether acids having at least seven carbon atoms and the general formula R—O—$C_nH_{2n}$—COOH wherein R represents aliphatic or alicyclic hydrocarbon radicals, are readily soluble in hydrocarbons of aliphatic, aromatic or hydroaromatic nature, and can be easily dissolved at normal or slightly elevated temperatures in animal, mineral and vegetable oils to give clear, stable solutions having valuable bactericidal and parasiticidal properties.

Typical examples of the acids from which these oil-soluble bismuth salts can be prepared are n-Hexyloxy-acetic acid
sec-Hexyloxy-acetic acid
n-Heptyloxy-acetic acid
Capryloxy-acetic acid
n-Octyloxy-acetic acid
n-Decyloxy-acetic acid
Cyclohexyloxy-acetic acid
Methyl-cyclohexyl-oxy-acetic acid
Menthyloxy-acetic acid
Fenchyloxy-acetic acid
Bornyloxy-acetic acid
Terpinyloxy-acetic acid and their homologues and analogues or in general the paraffin and cyclo-paraffin ethers of hydroxy-acetic acid wherein the paraffin group contains more than five carbon atoms.

Additional acids falling within the above formula that give oil-soluble bismuth salts and in which $n$ represents a number greater than 1 are the butyl-, amyl-, hexyl-, heptyl-, octyl-, nonyl-, decyl-, cyclohexyl- and bornyl- ethers of hydroxypropionic and hydroxybutyric acids.

These acids may be prepared in any known manner as, for example, by reacting a halogen derivative of an aliphatic acid with a sodium alcoholate as described in my prior Patents No. 1,920,137, granted July 25, 1933, and No. 1,969,709, granted August 7, 1934.

The bismuth salts of these acids may be prepared by treating the free acid with the oxide, hydroxide or carbonate of bismuth, preferably in the presence of an organic solvent for the salt that is being prepared. For example, 10 grams of capryl-oxy-acetic acid $$CH_3-(CH_2)_5-\overset{CH_3}{\underset{|}{C}H}-O-CH_2-COOH$$

prepared by condensing sodium octylate-2 with chloracetic acid, was boiled for four hours under reflux with 7 grams of bismuth hydroxide in 50 grams of xylene. About 25 grams of xylene were then distilled off to remove the water formed during the reaction. The residue was filtered and the xylene evaporated off at reduced pressure leaving bismuth caproyloxy-acetate as a pale, waxy mass, having a composition approximating that of bismuth dicaproxy acetate.

In an analogous manner the other oil-soluble bismuth salts of the other acids set forth above may be prepared. In place of the sodium octylate-2 the sodium alcoholate of hexyl-, heptyl-, nonyl, decyl or higher homologous alcohol may be used and in place of chloracetic acid one may employ β-chlor-propionic acid, γ-chlor-butyric acid or the chlorine substituted higher aliphatic acids. The mixtures of higher monohydric alcohols obtained as a by-product from the synthetic manufacture of methanol by the catalytic hydrogenation of carbon monoxide, and comprising the fraction boiling substantially at 160–220° C. have been found suitable for the preparation of ether acids that consist essentially of isomeric octyl- and possible higher ether acids, the bismuth salts of which are extremely soluble in fatty oils.

It has further been found that the bismuth salt of capryloxy-acetic acid in olive oil solution is best suited for use in the treatment of the aforementioned diseases but other vegetable and animal oils may be used and for the general combating of micro-organisms any of the mentioned bismuth salts dissolved in animal, mineral or vegetable oils are useful.

It will be obvious to those skilled in this art that the bismuth compounds here disclosed and their oil solutions can be used in various ways both therapeutically and otherwise and it is intended that this patent shall cover the novel bismuth compounds described and their oil solutions irrespective of the particular use to which they are to be applied.

This application is a continuation-in-part of my co-pending application Serial No. 588,499, filed January 23, 1932, now Patent 2,044,968 granted June 23, 1936.

I claim:

1. A monohydroxy bismuth salt having in the molecule two ether acid radicals from an acid of the general formula R—O—$C_nH_{2n}$COOH, wherein R represents a member of the group consisting of alkyl radicals containing from four to ten carbon atoms inclusive and monocyclic hydroaromatic hydrocarbon radicals, and $n$ is from 1 to 3.

2. A monohydroxy bismuth salt having in the molecule two ether acid radicals from an acid of the general formula R—O—$CH_2$—COOH, wherein R represents a member of the group consisting of alkyl radicals containing from four to ten carbon atoms inclusive and monocyclic hydroaromatic hydrocarbon radicals.

HERMAN A. BRUSON.